April 23, 1935.  J. F. SHEPPARD ET AL  1,998,466
BRONZING MACHINE
Filed June 3, 1930   7 Sheets-Sheet 1

INVENTORS.
Joel F. Sheppard, Frank C. Stevens
BY  & Carl G. Lindbom.
Snell, Dunn & Anderson
ATTORNEYS.

April 23, 1935. J. F. SHEPPARD ET AL 1,998,466
BRONZING MACHINE
Filed June 3, 1930 7 Sheets-Sheet 2

INVENTORS.
Joel F. Sheppard, Frank C. Stevens
& Carl G. Sundborn
BY
Duell, Dunn & Anderson
ATTORNEYS.

April 23, 1935.  J. F. SHEPPARD ET AL  1,998,466
BRONZING MACHINE
Filed June 3, 1930  7 Sheets-Sheet 3
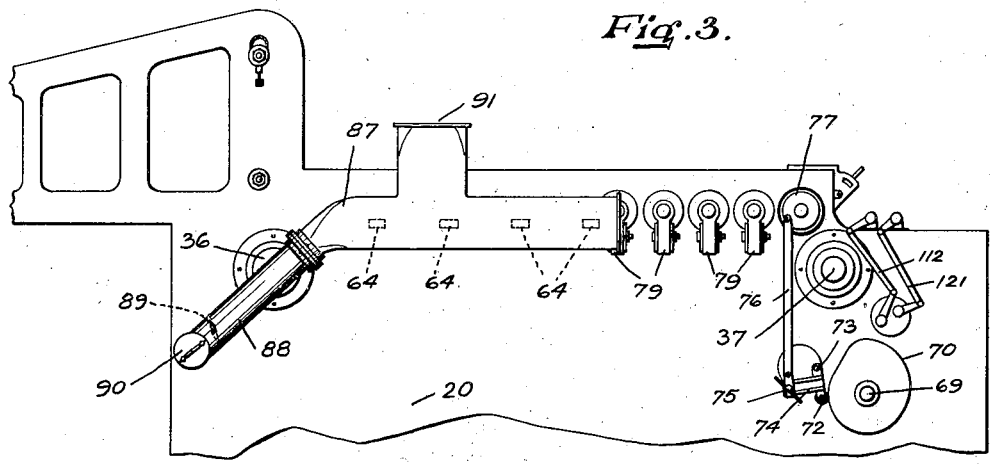
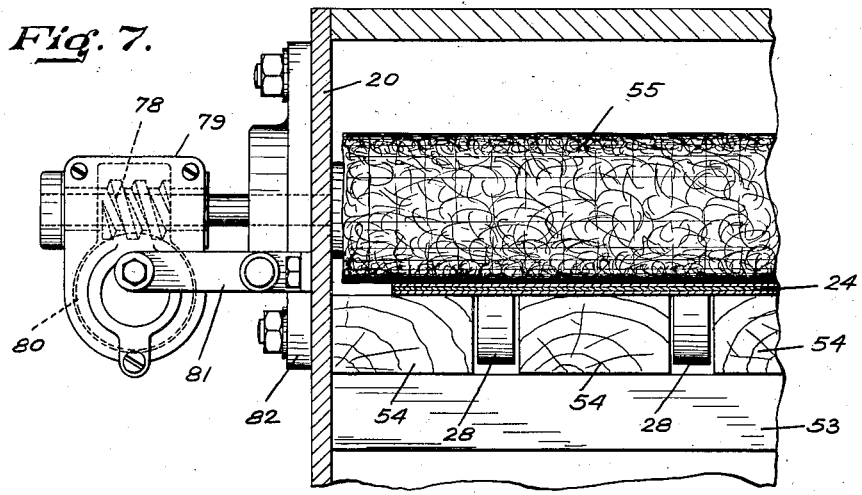
INVENTORS.
Joel F. Sheppard, Frank C. Stevens
BY  & Carl G. Sundlove.
Buell, Dunn & Anderson.
ATTORNEYS.

April 23, 1935.   J. F. SHEPPARD ET AL   1,998,466
BRONZING MACHINE
Filed June 3, 1930   7 Sheets-Sheet 4
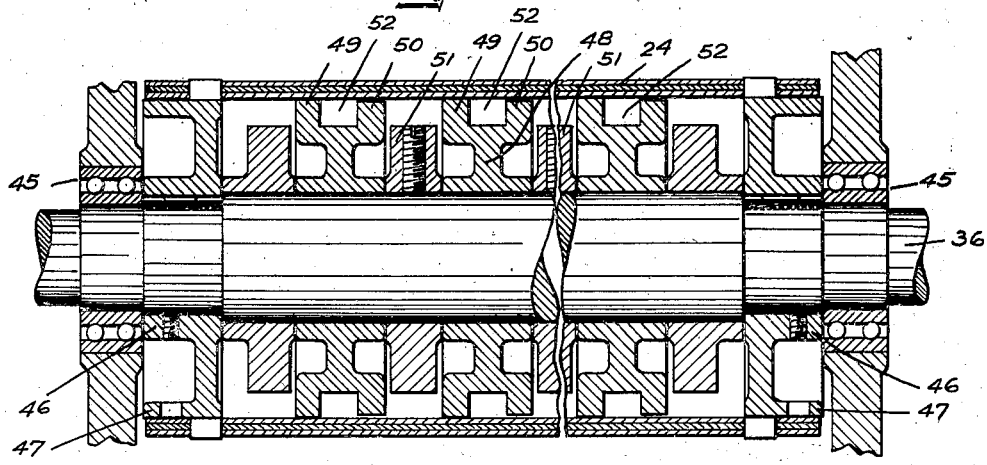
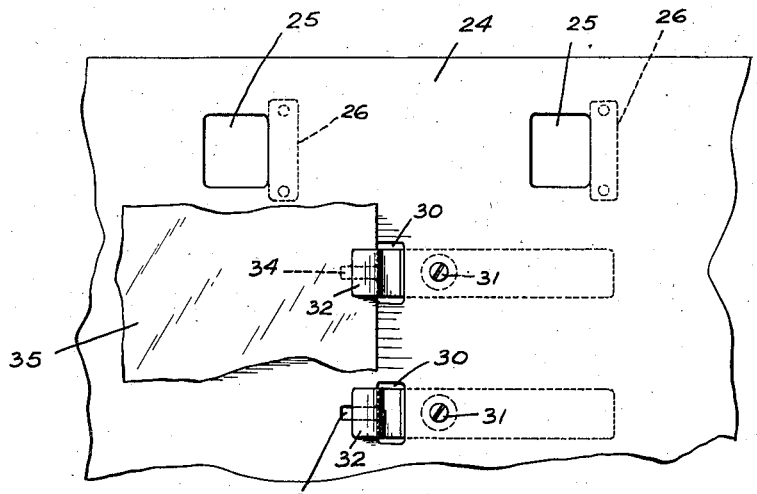
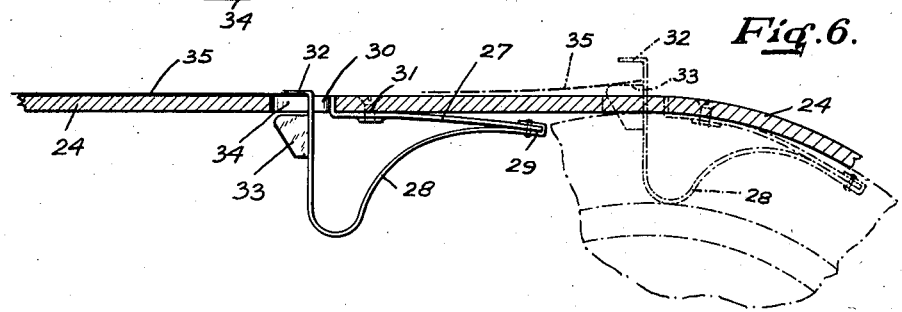
INVENTORS.
Joel F. Sheppard, Frank C. Stevens &
Carl G. Lindbom.
BY
Buell, Dunn & Anderson.
ATTORNEYS.

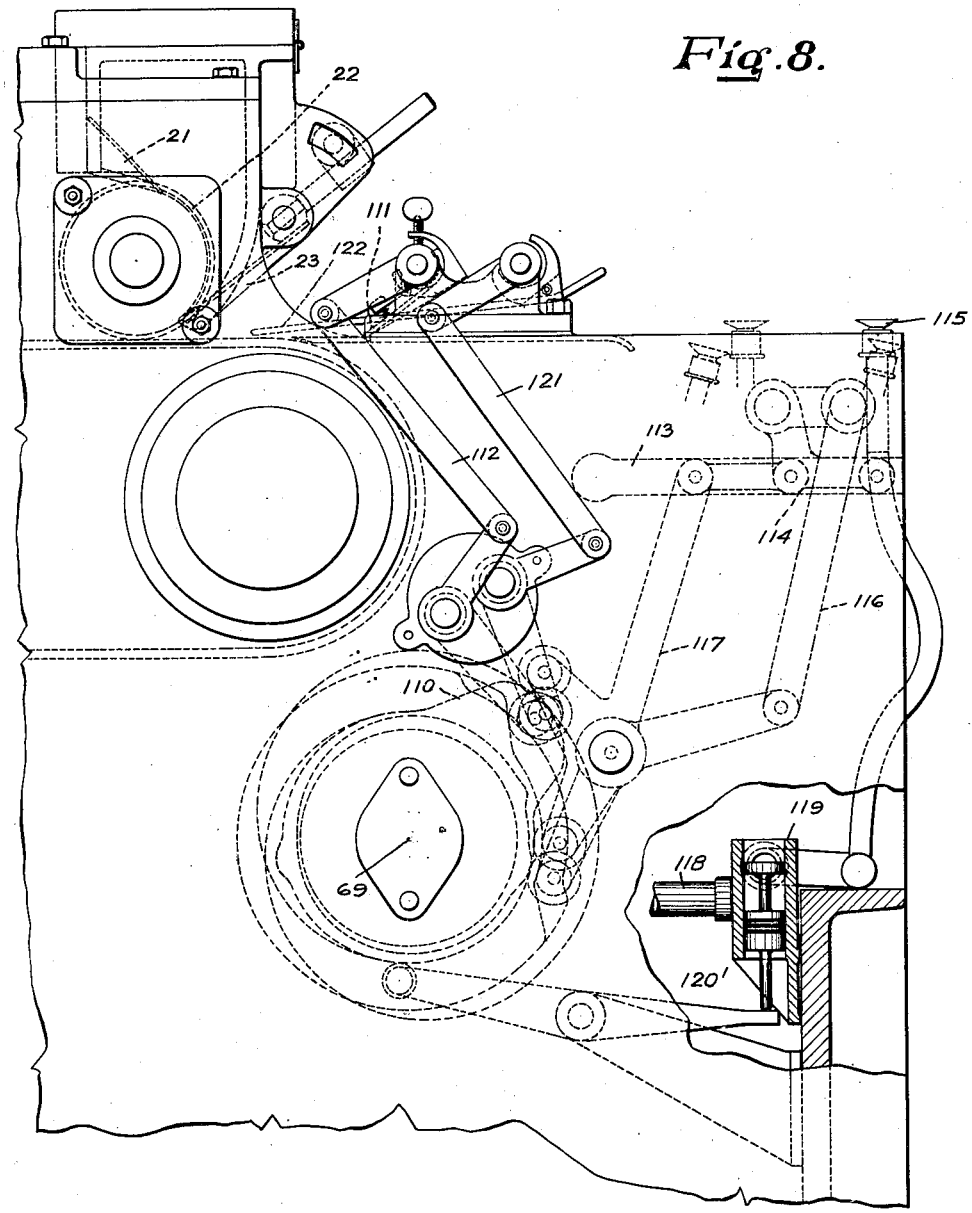

April 23, 1935.  J. F. SHEPPARD ET AL  1,998,466
BRONZING MACHINE
Filed June 3, 1930   7 Sheets-Sheet 6
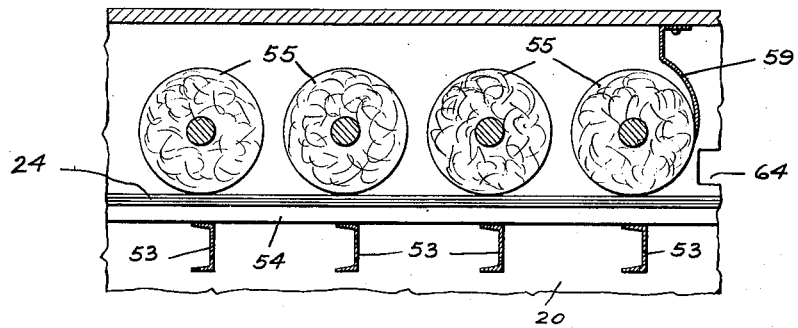
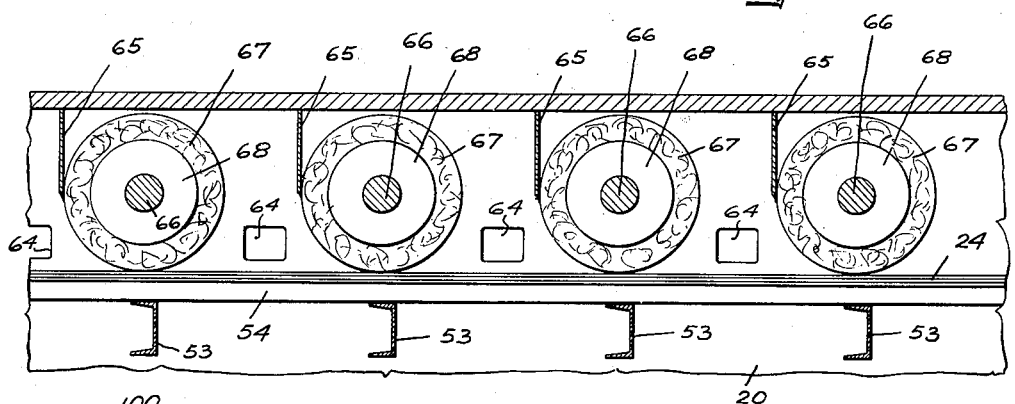
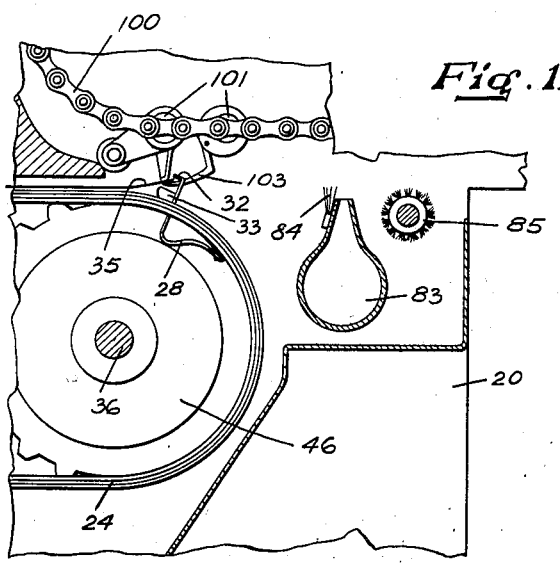
INVENTORS.
Joel F. Sheppard, Frank C. Steinus
BY  & Carl G. Lindbom.
Snell, Dunn & Anderson.
ATTORNEYS.

April 23, 1935.  J. F. SHEPPARD ET AL  1,998,466
BRONZING MACHINE
Filed June 3, 1930   7 Sheets-Sheet 7

INVENTORS.
Joel F. Sheppard, Frank C. Stevens
& Carl G. Lindbom.
BY
Duell, Dunn & Anderson.
ATTORNEYS.

Patented Apr. 23, 1935

1,998,466

UNITED STATES PATENT OFFICE 1,998,466

BRONZING MACHINE

Joel F. Sheppard, Frank C. Stevens, and Carl G. Lindbom, Dover, N. H., assignors to U. P. M.-Kidder Press Co., Inc., Dover, N. H., a corporation of Delaware Application June 3, 1930, Serial No. 459,032

3 Claims. (Cl. 91—59)

This invention relates to a functionally and structurally improved applying machine which may be used in numerous different associations but which is particularly adapted for the application of substances such as powders and especially metallic powders to the faces of sheets.

It is an object of this invention to provide a machine of this character, the parts of which will be relatively few in number and individually simple and rugged in construction, these parts being capable of ready assemblage, and when so assembled, furnishing a machine operating over long periods of time with freedom from mechanical difficulties and with a minimum of manual attendance.

A further object of the invention is that of furnishing a machine in which the work will be almost uniformly perfect and in which the sheets, after delivery from the machine, will be free from smudging.

A further object is that of constructing a machine capable of handling a maximum number of sheets within a predetermined interval of time and in which the feeding of the sheets from the press or corresponding unit will be automatic and in which, moreover, the delivery of these sheets will likewise be automatic.

A still further object is that of furnishing an apparatus of this character which will utilize a minimum of powder or its equivalent, and in which the atmosphere adjacent to the machine will not be filled with powder particles.

An additional object is that of providing a novel feeding and/or delivery mechanism which, while preferably utilized in conjunction with the body of the machine, may be employed independently of the latter, it being of course obvious that the machine mechanism per se may likewise, within the province of the present invention, be employed independently of the feeding and/or delivery mechanism.

With these and further objects in mind, reference is had to the attached sheets of drawings illustrating one practical embodiment of the invention and in which:

Fig. 3 is a view taken from the opposite side from that shown in Fig. 2;

Fig. 4 is a transverse section through one of the conveyor rolls;

Fig. 5 is a fragmentary plan view of a portion of the conveyor;

Fig. 6 is a sectional side view of the conveyor;

Fig. 7 is an enlarged partly sectional view showing one form of mechanism by means of which reciprocation of the burnishing rolls may be effected;

Fig. 8 is an enlarged side view of the forward portion of the machine and showing the foundation or depositing station, the stop fingers and the sheet feeding mechanism;

Fig. 9 is an enlarged fragmentary sectional side view of the burnishing station;

Fig. 10 is a similar view of the cleaning station or section of the machine;

Fig. 11 is a fragmentary sectional view showing the belt adjacent the point at which the sheets are delivered therefrom to the "pile delivery" mechanism;

Figure 1:
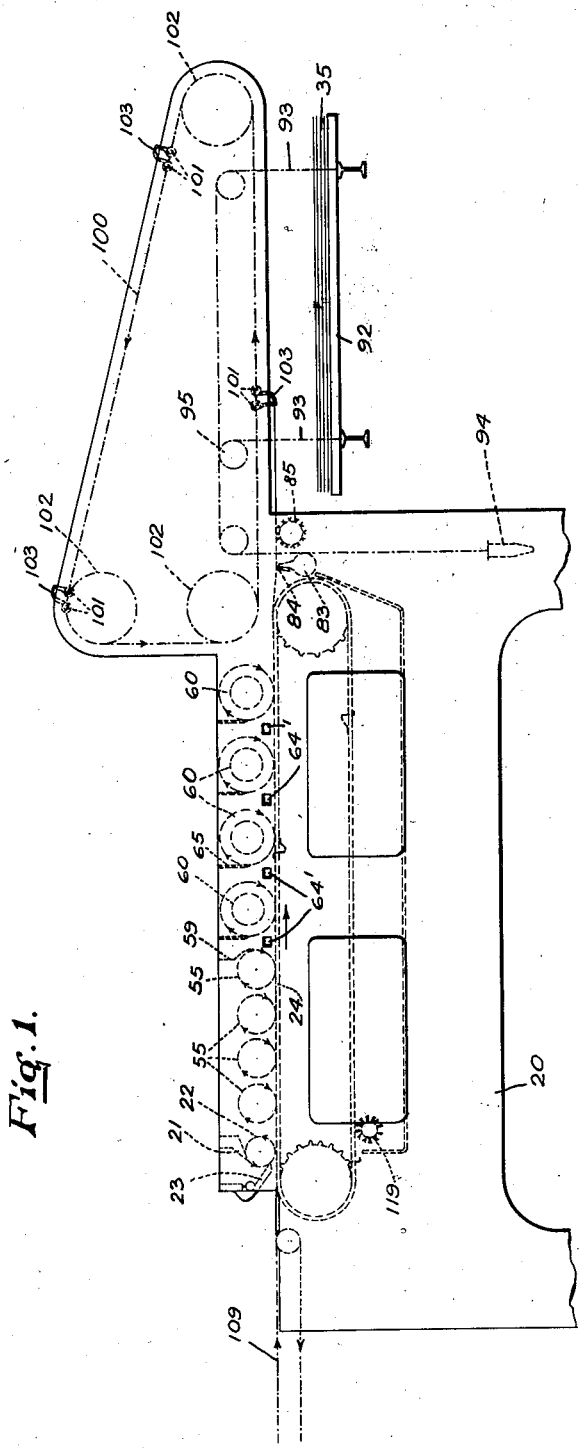
Fig. 1 is a side elevation of the machine with the driving mechanism eliminated therefrom.

By means of the present invention, a machine is provided which is capable of use in numerous different associations. Primarily, and according to the preferred and illustrated embodiment of the invention, the machine is to be employed for the application of substances to sheet material. A machine of the character is ordinarily known to those skilled in the art as a "bronzer". As such, the substances usually take the form of a powder simulating in appearance gold, silver, etc., and the material, to predetermined areas of which the powder is applied, is usually paper or cardboard of desirable thicknesses. It will readily be understood, however, that the substances to be applied and the material which receives them, might be varied in many respects without material alterations to the machine and, moreover, that the machine might have its several parts modified and rearranged in numerous respects from the disclosure herein illustrated.

Thus, in the several views, the numeral 20 indicates the base or frame of the machine which has one of its ends positioned adjacent to a delivery mechanism, and by means of which the material is fed to the machine. This delivery mechanism in turn extends from a press or other unit (not shown) in which the material and specifically the sheets have portions of their faces coated with a sizing laid out according to the design which is to appear upon the face of the sheet after passing through the machine. The structure of the press or other unit by means of which the adhesive is applied to the face of the sheets or their equivalents might be designed according to the especial needs of the articles which are to be coated and in order to assure a maximum number of sheets with their upper faces properly sized or otherwise treated to receive and retain the material applied thereto by a machine embodying the features of the present invention.

Referring to the machine, the latter embraces four major sections. In the first of these, the sheets of material are fed to the machine. These sheets in the second section receive the substances, i. e. powder or its equivalent, which is to be applied to the sized areas of their faces. In the third section, this substance is coated on the sheets and the latter are cleaned, and in the fourth and final section, the sheets are delivered.

For the sake of convenience, the second section will primarily be referred to. This may include, for example, a hopper 21 within which a roller 22 extends. This roller may be covered with a deep pile plush belt and a blade 23 may cooperate with the surface of the roller in order first to limit the amount of powder or other substance removed thereby from the hopper, and secondly to cause the tufts or hairs of the plush to snap outwardly and downwardly, thus impelling the powder towards the upper face of the sheet underlying this roller.

The sheets of material are moved past the depositing station, thus provided, by means of a conveyor which in certain respects also forms a part of station or section two hereinbefore referred to. This conveyor, however, additionally serves to move the sheets to successfully traverse sections three of the machine and be fed to a point at which they pass through the mechanism comprising section or station four of the machine.

As will be seen referring particularly to Figs. 4, 5 and 6, this conveyor preferably embraces a multi-ply belt 24 formed preferably of layers of cloth and rubber and provided adjacent its side edges with sprocket openings 25. The latter may be reenforced as, for example, by strips of metal 26, one ply of the belt being preferably removed at these points so that the strips lie flush with the belt face. The belt, moreover, is formed with rows of openings, these rows in the present exemplification being three in number. Associated with the belt adjacent these openings are grippers, each of which, according to the present invention, preferably include a spring strip 28 and a rigid member 27 secured together as, for example, at 29. The first of these strips has its outer end extending at right angles to its body and lying in contact with the edge of one of the openings 30. This strip together with the strip carried thereby is retained in such position as, for example, by a clamping screw 31. The second strip 28 is bowed downwardly and upwardly and terminates in a right angular extension 32 lying at a point beyond the rear edge of the opening 30 and overlying the belt. This strip also carries an ejecting or expelling element 33, known to those skilled in the art as a "shoo fly". This element lies in line with an extension 34 of the slot 30 and normally occupies a position below the plane into which the outer face of the belt extends. It is obvious by this construction that an operator may apply these gripper elements or fingers to the belt, and after the latter is mounted, as hereinafter explained. More particularly, it would be clear in this connection that the strips 27 and 29 may be brought to positions immediately adjacent each other and inserted one through each of the openings 30 so that they lie as shown in Fig. 6. Thereupon, by simply retaining the parts against displacement with one hand and applying the retaining screw 31 with the other hand, an operator is assured that the gripper is firmly anchored and properly disposed relatively to the belt and the mechanism associated therewith. These grippers, as will be hereinafter explained, serve, when elevated from the surface of the belt, to accommodate the leading edge of a sheet 35, this being one of the sheets to which the powder, or its equivalent, is to be applied. Thereafter, if the grippers are released, the portions 32 thereof as shown in Figs. 5 and 6 bear intimately against the sheet adjacent its forward edge, and prevent movement of the same with respect to the belt body.

Mounted adjacent opposite ends of the main body of the frame 20 are shafts 36 and 37, the former being driven as, for example, by a sprocket 38 and chain 39, and the latter being in turn driven conveniently by a sprocket 40 which is secured to a stub shaft carrying a bevel gear meshing with a corresponding gear 41 secured to a shaft 42 rotatably mounted on the side of the frame. This shaft 42 by means of a chain and sprockets 43 is driven by a shaft 44, hereinafter referred to in greater detail.

With one exception hereinafter noted, the shafts 36 and 37 mount similar elements. Referring to Fig. 4 where shaft 36 has been illustrated, it will be observed that the latter is mounted by bearings 45 and fixedly carries sprockets 46 having flange portions 47 serving as supports for the underside of the belt, it being noted that the teeth of these sprockets extend through the openings 25 to move with the belt.

Loosely mounted upon the shaft and in fact, if desired, suported upon anti-friction bearings carried thereby are a series of ring shaped supports 48 which according to the preferred embodiment are similar in structure to grooved pulleys in that they present flange portions 49 and 50 adjacent their side edges. The flange 50 of each pulley-like support is of less diameter than the flange 49 thereof, and the supports are disposed along the shaft preferably so that the flange 50 of one support is adjacent the flange 49 of an adjacent support, and the flange 50 of the latter is in turn disposed nearest to the flange 49 of the next supporting member. The difference in diameter between the flanges 49—50 is minute. For example, the flanges 49 in one operative form of the device may have a diameter of 8.675", while the flanges 50 may have a diameter of 8.633". This difference, while minute, nevertheless furnishes in aggregate a roller which, in effect, has a series of crowned portions. The supporting members 48 are spaced from each other by means of washers 51 which may be fixed to the shaft 36 as, for example, by set screws, and thus a proper spacing of the belt supporting members is assured, it being noted that the depth of the grooves 52 of the corresponding members associated with the shaft 37, and that the grippers associated with the belt ride within these grooves when passing around the shafts 36—37.

Heretofore when an attempt has been made to have a belt of for example six foot width run straight, great difficulty has been experienced. A belt of this width is necessary in order that sheets of material 35 of correspondingly large areas might be accommodated. It has been entirely feasible to maintain the path of travel of a narrow belt and difficulties incident to the belt tending to move off to one side in the case of a wide belt could be overcome by crowning the drums or rollers supporting the same. However, such a construction results in the belt crowning and aside from the fact that difficulty would accordingly be experienced in having the grippers cooperate with a straight edge sheet, the mechanism serving to coat the sheet could not very well be built commercially to cooperate effectively with the sheet surfaces. Also, if an attempt is made to maintain the position of the belt by reenforcing the latter and having the sprocket openings strengthened to an extent sufficient to overcome any tendency of the belt to move in an oblique direction, it is found that the belt quickly becomes torn to pieces due to the strains imposed thereon. However, by means of the construction described in the preceding paragraph, a crowning effect is achieved without the outer surfaces of the belt occupying a position other than that of a substantially true plane. Accordingly, the sheets are not distorted nor is any difficulty experienced in connection with the grippers cooperating with the sheet. Also by having the several supporting members preferably free to move with respect to the shaft, there is no drive of the belt except at portions adjacent the edges of the latter, and only there when it rides over the power shaft, i. e., in the present embodiment the shaft 36. Under these circumstances, it has been found that the belt runs entirely true. In fact, even if outside pressure is exerted in an endeavor to cause the belt to travel as a tangent, such tendency will be counteracted to the greatest extent by the construction disclosed.

In order to support the upper run of the belt in its travel through the machine, a series of girts 53 are provided below the belt and mounted by the frame. These girts mount upon their upper faces or edges bearing strips 54 preferably formed of hard wood and spaced from each other to an extent adequate to permit of the passage therebetween of the strips 28 of the grippers.

Figure 2:
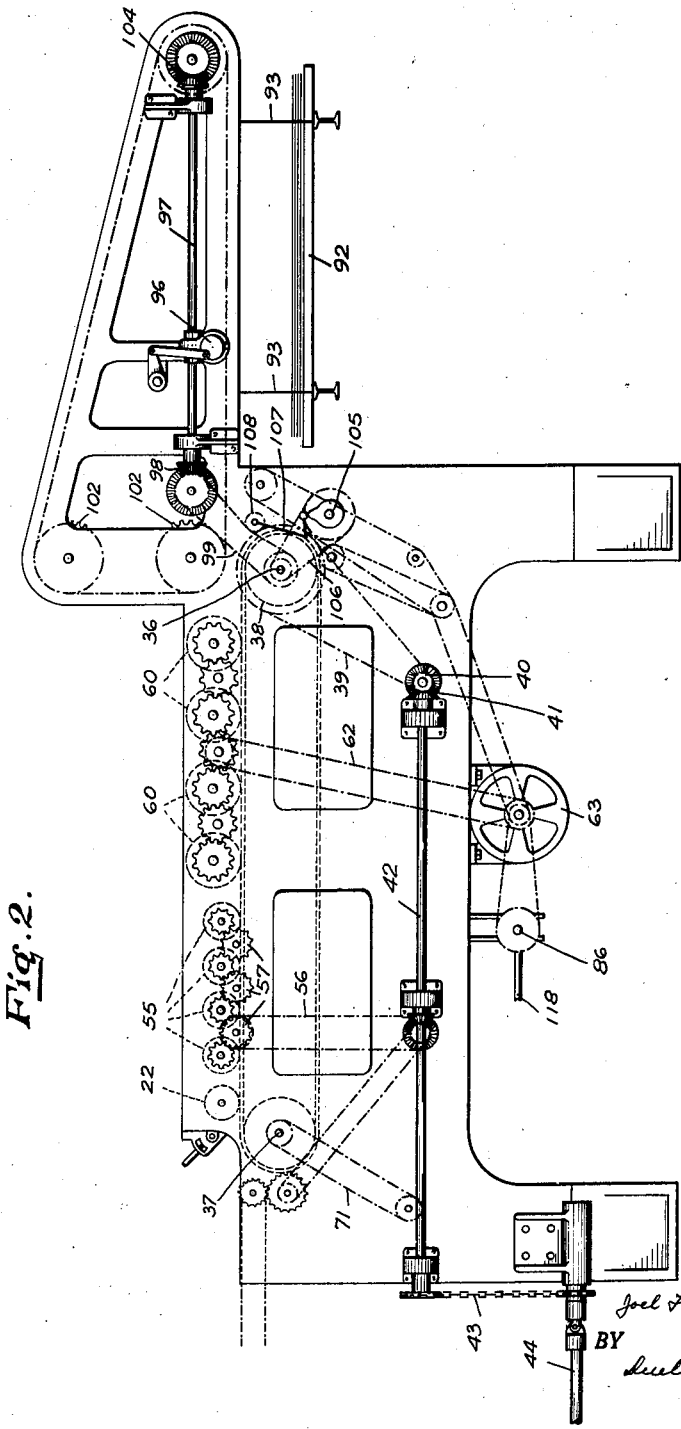
Fig. 2 is a similar view with the various drive mechanisms shown.
Figure 12:
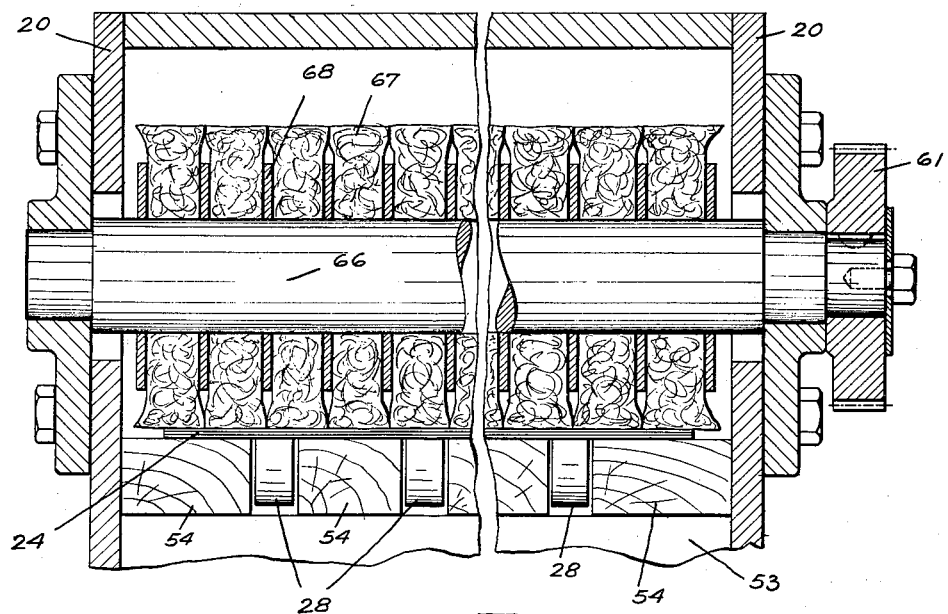
Fig. 12 is a fragmentary enlarged view taken transversely of the machine and showing one of the cleaning rolls which cooperate with the upper faces of the sheets.
Figure 13:
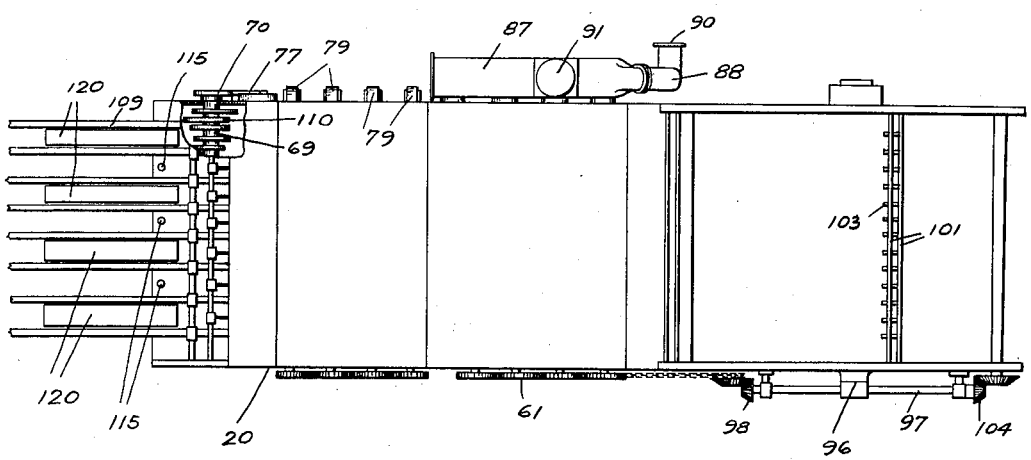
Fig. 13 is a plan view of the entire machine.

Now, after the sheets have been moved by the belt under the roller 22 which forms what might be termed the fountain, they move into the coating compartment. This compartment, according to the present invention, preferably encloses a series of rolls 55, which are driven as shown in Fig. 2 preferably by means of a sprocket chain 56 extending from the shaft 42 and by means of intermediate coupling gears 57. These rolls serve to rub in the powder, or its equivalent, and burnish the coated surfaces. Their drive is opposed to the direction of travel of the sheets and they are covered preferably with wool skin or a similar substance. Thus, they effect a wiping contact with the coated surfaces serving to imbed the powder particles into the surface of the sizing upon the sheets. To the rear of the last roll 55 a partition member 59 is provided extending to a point immediately above the surface of the sheet or in contact with the surface of the last roll, thus forming in effect a seal at the end of what might be termed the bronzing or powdering compartment. In view of the fact that no exhausting means is preferably provided in association with this compartment, the interior of the same is at all times filled with a cloud of powder which serves first, in cooperation with the rolls, to effect the perfect coating of the sheets, and secondly to economize to a maximum extent with regard to the powder, in that the body of the latter will be in effect removed from the surface of the sheet and retained within this compartment, and the sheet now moves—under the influence of the belt—to the cleaning compartment.

At this time, it will, of course, be understood that the space between the sides of the frame 20 and above the rolls is closed by a covering plate, and referring to the cleaning compartment, it will be noted that it encloses a series of rolls 60 moving preferably in opposition to the sheet and driven by gears 61 through a chain 62 extending from the drive of a motor 63. Extending in line with the spaces between the rolls 60 are openings 64 to which the ends of an exhaust manifold are connected. At points opposite to the openings 64 further openings 64' are provided which preferably are connected with the outer atmosphere so that as air is drawn through the compartment, transverse air flows will be established. Cooperating with the surface of each of the rolls are blades 65 serving to remove the surplus powder, the latter being diverted into the air current and being sucked out through the exhaust openings.

Each of the rolls is preferably of a composite nature and includes a shaft 66 upon which are mounted a series of cotton or similar disks 67 spaced from each other by washers 68 of a diameter less than that of the disks. As a consequence, the latter tend to "mushroom" at points beyond the disks, and thus a surface is presented which is of a soft and fibrous nature. No damage will result to the sheets as a consequence, although a maximum cleaning action will be exerted thereon. These sheets with their upper faces properly coated and cleaned now move to a point beyond the shaft 36 and out of contact with the conveyor.

Thus, referring to the fountain, depositing and cleaning sections or stations of the machine, it will be obvious that a sheet associated with the conveyor moves under the roller 22, or its equivalent, by means of which powder or similar material is deposited upon the face of the sheet. In the event that, as shown, a roller is employed, it is in many respects desirable to have the same move intermittently. With this in mind and as shown in Fig. 3, a shaft 69 is secured to the frame of the machine and mounts a cam 70, this shaft being driven as, for example, by a sprocket chain 71 extending from the shaft 37. The edge of the cam engages a roller 72 associated with a bracket 73 pivotally secured to the frame of the machine and this bracket embraces guideways 74 within which a block 75 is shiftably positioned. This block is connected to a lever 76 secured to one unit of a ratchet mechanism 77, the second unit of which is secured to the shaft mounting the roller 22. Thus, each time the cam 70 revolves, the bracket 73 is oscillated to reciprocate the lever 76 and shift that portion of the ratchet mechanism 77 to which it is connected. According to the position of the block 75 and the guideways 74, such shifting will be to a greater or to a less extent. Consequently, the volume of powder or equivalent material delivered to the sheet will be varied.

In addition to the rotary movement imparted to the burnishing rolls 55 by means of the sprocket and gear wheels associated therewith, it is desired in order that a maximum effect be achieved that these rolls be given a motion transverse to the conveyor. With this in mind, one form of mechanism which may be provided is that shown in Fig. 7. In this figure, it will be observed that that end of the shaft opposite to the end which receives the drive 56 is extended beyond the frame of the machine and at this point mounts a worm 78 confined within a journal 79 having rotative bearing with the shaft. This worm drives a worm wheel 80 having one end of a pitman 81 eccentrically connected to its body, the opposite end of this pitman being pivotally connected to a bracket 82 affixed to the frame of the machine. Consequently, as the rolls are driven to rotate, the worm will cause the gear or wheel 80 to be rotated. Obviously, this will cause the bracket 79 together with the end of the shaft to be reciprocated thus achieving the desired result. It will be apparent that in order to allow of this transfer movement, the gears and/or sprockets associated with the rolls 55 for the purpose of turning the same are slidably keyed thereon. The sheet now moves through the cleaning department and subsequently is discharged from the surface of the belt or conveyor.

Provision must now be made for cleaning the under side of the sheets as they are delivered, and with this in mind, an exhaust duct or nozzle 83 is provided to the rear of the shaft 36 and in line with the path of travel of the sheets. This nozzle cooperates with the underface of the sheets and with a view not alone to dislodging particles of powder or other substance from the lower faces of these sheets but also to prevent the latter from "freezing" against the nozzle, a spacer brush 84 is provided extending in advance of the nozzle and slightly above the upper surface of the latter. Thus these sheets, in advance of passing the nozzle station, ride into contact along their under faces with the brush 83, and in order that the cleaning operation may be complete, there is provided preferably immediately to the rear of this cleaning nozzle a brush 85 rotating in a direction opposed to the direction of travel of the sheets. Thus, all particles of foreign material, such as powder which is adhering to the under face of the sheet and have not been removed by either the brush 84 or the nozzle 83, will be freed by the brush 85 and impelled by the latter towards the nozzle so that this element may pick up the powder while in suspension. Consequently, the powder will not be projected into the atmosphere with consequent danger to health and wastage of material and the underfaces of the sheets will be effectively cleaned.

A manifold 87 is connected to the openings 64 and to a suitable source of vacuum (not shown). The manifold also has its end extended as at 88 and this end is connected to the nozzle 83, variations in the degree of suction at this point being obtained as, for example, by the use of a valve 89. The manifold may be provided with an outlet 90 through which powder removed by means of the same may be salvaged. The source of vacuum supply is connected to this manifold preferably at 90, and it will be understood that suitable filters and traps may be provided for the salvaging of powder flowing therethrough.

Now referring to the delivery station of the machine, it will be understood that the sheets of material might be permitted to simply drop into a receiving compartment as they move out of supporting contact with the conveyor, or they might be delivered to fly sticks. It is preferred, however, according to the present invention to have these sheets delivered so that they are arranged in a compact pile and also in such manner that there is no danger of the sheets being injured or the coated surfaces being smudged. With this in mind, a lowering pile delivery is provided at the rear end of the machine by the use of a supporting member 92 suspended from chains or cables 93 which may be maintained in properly taut condition by, for example, counter-weights 94, a suitable mechanism including pulleys 95 being provided for lowering the support. These pulleys are actuated by an intermittent mechanism 96 driven by a shaft 97. This shaft is rotated continuously by means of gearing 98 and a sprocket chain drive 99 extending from shaft 36. Thus as the shaft 97 rotates, the support will be lowered in order to accomodate an increasing depth of sheets delivered by the conveyor overlying this support. This conveyor includes preferably a pair of chains 100 connected by cross bars 101 and passing over sprockets 102. The cross bars support gripper bars and pads 103 which are actuated by trips (not shown) to engage and release the sheet. The chains are driven for example by the outermost sprocket 102 being coupled by gearing 104 to the shaft 97, and thus a conveyor is provided which moves at a speed identical with the speed of movement of the conveyor provided by the belt 24.

Adjacent the receiving end of the machine, the grooves of the pulley members providing the supports 48 are, as aforestated, sufficiently shallow to cause the extended portions 28 of the gripper strips to be elevated to an extent sufficient to permit of the insertion thereunder of a leading edge of a sheet of material in a manner hereinafter brought out. Also, as aforebrought out, the grooves of the pulley members associated with the shaft 36 are not as deep as the grooves of the supporting members aforementioned. Consequently, the gripper fingers will not alone be elevated to an extent sufficient to release the sheet, but the shoo flies or expelling members 33 will move through the slots 34 to deliberately elevate the leading edge of the sheet as has been indicated in Fig. 6. Obviously, the raising of the gripper fingers will be maintained until that portion of the conveyor with which they are associated passes around the roller structure mounted by the shaft 36. In other words, the elevation will be continued long after the gripper fingers have moved out of contact with the sheet. When the parts have reached the position indicated in dotted lines in Fig. 6, it will be apparent that the gripper elements 103 associated with the conveyor 100 are moving at a point immediately adjacent the leading edge of the sheet—the parts being timed to effect this result. Now, in order that the leading edge may be securely engaged by the gripper elements 103, a number of suitable structures may be developed. For example, a cam 105 is operated by a sprocket drive 106 from the shaft 36 and serves to periodically rock a bell-crank lever 107 carrying a roller 108. The latter bears against the chain 99 and thus periodically tensions the latter resulting in a retardation on the part of the shaft 97, and consequently, the conveyeor 100 and the gripper elements 103 carried thereby. As a consequence, the leading edge of the sheet is adequately projected within the space defined within the gripper elements 103 as the latter are tripped, thus assuring a firm contact and adequate supporting of the sheet as it moves from the belt conveyor. As the rear edge of the sheet moves beyond the brush 85, a trip (not shown) releases the gripper elements 103, and the sheet now floats gently down to rest upon the uppermost sheet of the pile disposed upon the support 92.

Now with reference to the first or feeding station which according to the present invention may form a part of the machine, it will be observed that a conveyor 109 extends to the forward portion of the machine proper. This conveyor may include a series of spaced tapes and extend from the delivery end of the press or coating unit, and receive at this point the sheets upon its upper run. The shaft 69 mounts, as shown in Fig. 8, a number of cams 110 additional to that which causes movement of the roller 22. Stop fingers 111 extend between the tapes providing the conveyor and may be elevated through the medium of operating mechanism 112 actuated by one of the cams 110. Such operation causes the fingers to periodically elevate so that sheets retained against movement by these fingers may continue to be fed towards the machine proper. At this time, it will be understood that while in many respects, it is preferred that the fingers extend into, or in fact, below the upper plane of the conveyor 109, that the structure of the latter might be of any desired type, and accordingly that the fingers or their equivalents might be modified so as to perform the function for which they are intended. The frame supports or provides track portions 113 within which a carriage 114 is movable. This carriage mounts, in the present exemplification, suction nozzles 115, and the latter may be projected to engage the under face of the sheet by an actuating mechanism 116, while the entire carriage may be reciprocated by a second and similar mechanism 117. Both of these mechanisms are operated by cams 110 and the timing is such that the cycle of movement of the nozzles is upwardly and into contact with the under faces of the sheets, thence towards the machine proper, then downwardly out of contact with the sheets, whereupon the carriage is returned to the initial position, i. e., away from the machine. It will be noted that the motor 63 drives an exhaust fan 86 which is connected by tube 118 to the nozzles 115. This tube is connected with a valve 119 connected through a lever 120', by means of one of the cams 110 and the valve serves periodically and with proper timing to cause an air flow through the nozzle 115 towards the fan or pump 86, and also to connect the nozzles with the atmosphere so that the sheets gripped by these elements will release readily. Between certain of the tapes providing the conveyor 109 "slowdowned" sticks 120 are positioned and these elements serve to frictionally engage the underfaces of the sheets as they move towards the stop fingers 111 to retard the movement of the former. In certain instances, it has been found that difficulty may be experienced incident to the tendency of the advance edges of the sheet to curl upwardly. More particularly, this effect would ordinarily result in the sheets being improperly engaged by the gripping fingers, or elements 32. In order to overcome this difficulty, an operating mechanism 121 is provided in association with one of the cams 110 and serves to actuate a series of top rods 122 which extend over the sheets and between the stop fingers 111. The mechanism 121 serves to depress the forward edges of the sheets into proper contact with the conveyor until the gripping fingers of the latter firmly engage the same, at which point this mechanism elevates the rods so that there is no danger of the sizing on the upper faces of the sheets being disarranged.

Referring to the operation of this mechanism, it will be understood that the sheets are successively delivered from the press, or its equivalent, and move at a high rate of speed by means of the conveyor 109. These sheets, upon coming in contact with the slowdowned sticks are frictionally engaged by the latter and a braking effect results which causes their rate of travel to be materially decelerated so that there is no danger of the forward edges of the sheet striking the stop fingers 111, or their equivalent, and rebounding to an extent such that a failure of feeding would result. The parts are arranged so that as the sheet is brought to a stop—with the conveyor 109 continuing to move—the nozzles 115 are elevated into contact and gripping engagement with the sheet. The fingers 111 now elevate and under the action of the nozzles, the sheet moves forward at an accelerated rate of speed and is tucked underneath the portions 32 of the gripping fingers. The latter, of course, are elevated, and the feed of the sheet is such that the forward edge of the latter remains in place until the portions 32 clamp against the sheet to prevent movement of the same with respect to the conveyor 24. Thereupon, the suction nozzle disengages from the under face of the sheet. It will of course be understood that as the suction nozzles feed the sheets the topping rods engage the forward edges of the same as aforebrought out, thus assuring the proper association of the sheets with the gripper fingers of the conveyor.

Reviewing briefly the operation of the machine, it will be apparent that the following occurs:

The sheets move from the press, or its equivalent, and are delivered to the conveyor 24 in a manner such as has been described in the preceding paragraph. Immediately upon entering the machine proper, powder is deposited thereon. The rate of feed of this powder is controlled by the setting of the operating mechanism which actuates the pawl and ratchet 77, and this control may also be varied by the blade 23. The sheets now move to the powder compartment where they are subjected to the action of the wiping and burnishing rolls 55. In this compartment, due to the fact that no exhaust is provided, the sheets are subjected to the action of virtually a cloud of powder and they then move to the cleaning station where, by means of the rolls 60, all surplus powder is removed from their upper faces. At this point, by means of the exhaust provided, all powder not remaining in contact with the upper faces of the sheets is removed and the cleaned sheets now move past the brush 84, nozzle 83 and brush 85, so that their under faces are cleaned. Thereupon, they are delivered to the pile on the support 92. It will finally be observed that a cleaning brush or its equivalent 123 may cooperate with the lower run of the conveyor 24 in order that the latter may present a clean surface to receive the successive sheets.

Thus a machine of this character is provided and by means of which a straight line feed may be furnished from the press to the delivery pile. Moreover, the sheets do not have to traverse any acute bends and thus there will be no danger of the sheets being cracked or the finish applied thereto by the machine being faulty. As a consequence of the sheets not traversing acute bends, it will also be understood that material of thicker and more brittle qualities may be passed through the machine without detriment. Additionally, no transfer cylinders are necessary in the present machine and as a consequence, a marring of the work incident to an offsetting action is avoided aside from the fact that it is accordingly not necessary to shut down and clean the machine. Moreover, by having the cleaning rolls, or their equivalent, isolated from the burnishing or rubbing-in rolls, it is practicable to economize on powder aside from the fact that the work has a better finish and all surplus powder is removed therefrom.

Finally, the value of driving the mechanism in the manner aforedescribed will be apparent to those skilled in the art. More particularly, it will be appreciated that the shaft 44 extends from the press, or equivalent unit, and as a consequence, the parts of the machine are in perfect timing with those of the press. All of the associated feeding and burnishing mechanism is connected by drives either directly or indirectly to the shaft 42, and thus timing throughout the machine proper will remain as originally set. By having the motor 63, as shown, preferably independent of the former drives, it will be obvious that even if the feeding of the sheets through the machine is stopped with consequent stoppage of the deposition of powder, that the cleaning mechanisms will continue to operate so that all objections in this connection will be avoided.

It will of course be understood that the machine may be utilized to advantage in numerous different associations. For example, it may be employed in a dusting operation, i. e., presuming that very fine work is to be done, the sheets after being discharged to the pile delivery will simply be removed therefrom and passed through a second machine of, for example, the type herein illustrated, but in which no powder or its equivalent will be deposited. This operation will serve effectively to remove all traces of powder even if the surfaces of the sheets are of such character that powder particles tend to adhere to them.

From the foregoing, it will be appreciated that, among others, the objects specifically aforebrought out are achieved. It will moreover be appreciated that numerous changes in construction and rearrangement of the mechanisms might be resorted to without in the slightest departing from the spirit of the invention as defined by the claims.

Having described our invention, what we claim as new and desire to secure by Letters Patent, is:

1. A machine of the character described, comprising a material depositing compartment, a substantially sealed agitating compartment, a material removing compartment, means for supplying material to said first named compartment, means for exhausting the material from the last compartment, each of said foregoing compartments being disposed in a series of stations in a horizontal plane of travel, and means for moving a sheet successively through all of said compartments, said last named means comprising an endless belt and a series of multi-crown rollers cooperating therewith.

2. A machine of the character described, comprising a material depositing compartment, a substantially sealed agitating compartment, a material removing compartment, means for supplying material to said first named compartment, means for exhausting the material from the last compartment, each of said foregoing compartments being disposed in a series of stations in a horizontal plane of travel, a plurality of rollers positioned adjacent said compartments, said rollers comprising a series of wheel segments of varying diameters disposed alternately with relation to each other so that the roller presents a number of crown portions along its periphery, and a traveler belt cooperating with said rollers whereby a sheet may be carried successively through all of said compartments and acted on thereby.

3. A machine of the character described, comprising a material depositing compartment, a substantially sealed agitating compartment, a material removing compartment, means for supplying material to said first named compartment, means for exhausting the material from the last compartment, each of said foregoing compartments being disposed in a series of stations in a horizontal plane of travel, a plurality of rollers positioned adjacent said compartments, said rollers comprising a series of wheel segments of varying diameters disposed alternately with relation to each other so that the roller presents a number of crown portions along its periphery, a traveler belt cooperating with said rollers whereby a sheet may be carried successively through all of said compartments and acted on thereby, means associated with said traveler belt for normally holding said sheet in position thereon, additional means carried by said rollers and cooperating with said first named means for releasing said sheet when the latter has passed through the last of said compartments, and further means carried by said first named means for simultaneously lifting said sheet above the surface of said traveler belt.

JOEL F. SHEPPARD.
FRANK C. STEVENS.
CARL G. LINDBOM.